United States Patent
Berzon

(10) Patent No.: US 12,032,120 B2
(45) Date of Patent: * Jul. 9, 2024

(54) PRIMER FOR TAC FILM AND LAMINATE

(71) Applicant: ESSILOR INTERNATIONAL, Charenton-le-pont (FR)

(72) Inventor: Ronald A. Berzon, Dallas, TX (US)

(73) Assignee: Essilor International, Charenton-le-pont (FR)

( * ) Notice: Subject to any disclaimer, the term of this patent is extended or adjusted under 35 U.S.C. 154(b) by 890 days.

This patent is subject to a terminal disclaimer.

(21) Appl. No.: 16/980,986

(22) PCT Filed: Mar. 14, 2019

(86) PCT No.: PCT/EP2019/056496
§ 371 (c)(1),
(2) Date: Sep. 15, 2020

(87) PCT Pub. No.: WO2019/175354
PCT Pub. Date: Sep. 19, 2019

(65) Prior Publication Data
US 2021/0011196 A1    Jan. 14, 2021

(30) Foreign Application Priority Data
Mar. 16, 2018  (EP) .................................. 18305295

(51) Int. Cl.
| | |
|---|---|
| G02B 1/04 | (2006.01) |
| B29D 11/00 | (2006.01) |
| G02C 7/12 | (2006.01) |
| B29K 33/00 | (2006.01) |
| B29K 105/00 | (2006.01) |

(52) U.S. Cl.
CPC ........ *G02B 1/041* (2013.01); *B29D 11/00009* (2013.01); *B29D 11/00644* (2013.01); *B29D 11/0073* (2013.01); *G02C 7/12* (2013.01); *B29K 2033/12* (2013.01); *B29K 2105/0002* (2013.01); *B29K 2105/0005* (2013.01); *G02C 2202/16* (2013.01)

(58) Field of Classification Search
CPC ...................................... C09J 4/06; C09J 4/00
See application file for complete search history.

(56) References Cited

U.S. PATENT DOCUMENTS

| | | | |
|---|---|---|---|
| 4,873,285 A | 10/1989 | Ryntz et al. | |
| 11,378,720 B2 * | 7/2022 | Berzon | ................ C09D 133/14 |
| 2003/0165686 A1 | 9/2003 | Blackburn et al. | |
| 2006/0103037 A1 | 5/2006 | Su et al. | |
| 2011/0242657 A1 | 10/2011 | Glacet et al. | |
| 2016/0057948 A1 | 3/2016 | Alkhazraji | |

FOREIGN PATENT DOCUMENTS

| | | |
|---|---|---|
| CN | 109791223 | 5/2019 |
| EP | 2426176 | 3/2012 |
| JP | 2016510131 | 4/2016 |
| WO | WO2005/093467 | 10/2005 |
| WO | WO2017/101009 | 6/2017 |
| WO | WO2018/052454 | 3/2018 |
| WO | WO 2018/052454 | 3/2018 |

OTHER PUBLICATIONS

Office Action issued in the corresponding Chinese Application No. 201980019652.0, dated Sep. 14, 2021.
International Search Report issued in corresponding International application No. PCT/EP2019/056496 mailed on May 24, 2019.

* cited by examiner

*Primary Examiner* — Marc S Zimmer
(74) *Attorney, Agent, or Firm* — Norton Rose Fulbright US LLP

(57) ABSTRACT

Embodiments of the disclosure relate to primer compositions for increasing the adhesion between a polarizing film laminate to a cast-polymerized lens. The chemisorptive primers may react with cast-polymerized lens monomers and/or interact with the polarizing film laminate to provide exceptionally strong adhesion between the film laminate and the ophthalmic lens.

14 Claims, No Drawings

PRIMER FOR TAC FILM AND LAMINATE

CROSS REFERENCE TO RELATED APPLICATIONS

This application is a national phase application under 35 U.S.C. § 371 of International Application No. PCT/EP2019/056496 filed 14 Mar. 2019, which claims priority to European Patent Application No. 18305295.0 filed 16 Mar. 2018. The entire contents of each of the above-referenced disclosures is specifically incorporated by reference herein without disclaimer.

FIELD OF THE INVENTION

The present disclosure relates to the field of ophthalmic lenses, including polarized ophthalmic lenses for spectacles and sunglasses.

BACKGROUND

Many sunglasses include a polarizing filter for blocking glare and reducing overall transmittance of light through the sunglass lenses. The effect of glare is created when sunlight reflects off a flat surface and the light is reflected in every direction. What a person perceives as glare is typically reflected horizontal light.

Polarized lenses mitigate glare by using a filtering film with molecules that are aligned in parallel relation to one another. The filtering films are typically oriented with the filtering molecules aligned vertically. The filtering film blocks most of the incoming horizontal light, while still allowing vertically polarized light to pass through the lens. Glare is eliminated because the reflected horizontal light waves cannot bypass the vertical filter.

Polarized sunglasses are particularly beneficial to boaters and fishermen because of the intense glare created by light reflecting off the water. Polarized sunglasses are also useful for a variety of outdoor activities, including golfing, biking, driving, and anyone who spends a lot of time outdoors, as polarized lenses block much of the horizontal light that is reflected from flat outdoor surfaces.

Many polarizing lenses are manufactured using fragile polyvinyl alcohol (PVA) polarizing films having an average thickness of approximately 30 μm. The polarizing film must undergo several handling steps, including thermoforming, cutting to a desired diameter, primer application, and fitting into a casting cell. The fragile nature of the thin polarizing film coupled with the multiple processing steps increase the potential for film damage. Polarizing PVA films are typically laminated between triacetyl cellulose (TAC) films in order to provide robust protective support layers over the PVA film surfaces.

The interaction of PVA film laminates with adhesion primers is critical to polarized lens production processes. Some industrial film primers adversely affect the optical quality of the PVA polarizing film and PVA film-containing laminates. Some industrial film primers provide poor adhesive performance and result in delamination during one of the many lens production and finishing process steps. There is often a trade-off between primer adhesive performance and effect on optical quality.

We also know from the prior art the document WO 2018/052454 that describes an enhanced primer formulation. This formulation may be used to enhance adhesion between a film or laminate, such as triacetyl cellulose (TAC) and a polymerizable or polymerized material in order to reduce or eliminate the potential for delamination.

Document JP 201 6/51 01 31 relates to a UV curing adhesive composition, and a method for preparing a polarizing lens by using the same, and more specifically, to a UV curing adhesive composition for preparing a polarizing lens, comprising 50-80 parts by weight of a monofunctional monomer, 14-49 parts by weight of an oligomer, and 1-6 parts by weight of a photoinitiator.

There is a need in the industry for polarizing laminate adhesive primers that have a minimal effect on optical quality and maintain film adhesion during lens production and finishing process steps.

SUMMARY

Disclosed herein are chemisorptive primers that provide robust adhesion between functional optical laminates and ophthalmic article substrates. The primers are formulated to include components that promote bonding to a functional laminate and/or an ophthalmic article substrate. Conventional primers rely on relatively weak primer-primer and primer-substrate electrostatic forces for adhesion. By contrast, the primers disclosed herein bind to the surfaces to which they are applied. The net results of these chemisorptive primers are enhanced adhesive strength and durability.

The primers disclosed herein particularly useful for adhering a TAC-based polarizing laminate in a cast CR39 optical element. The primers are designed to provide a level of penetration into the surface of a TAC layer or other laminate layer. The film-penetrating quality of the primers contributes to its adhesive properties.

Especially, a primer as disclosed herein comprises at least one reactive oligomer or high molecular weight polymer with a $M_w$ between about 2,000 and about 100,000 in an amount ranging from 1 wt. % to 25 wt. %, at least one UV or thermal initiator, and at least one monomer in an amount ranging from 0.25 wt. % to 15 wt. % that is capable of reacting with a lens polymerized monomer, wherein the primer coating monomer is the same as the lens polymerized monomer or is different and is selected to include the same reactive functional group as the lens monomer. This primer composition is a curable composition, and those of skill in the art will recognize that a curing process will lead to chemical reactions that may alter some of the primer components. In some embodiments, the primer component functional groups are selected to interact with the laminate films and react with the substrates with which they will adhere. In this way, a primer composition as disclosed herein can be designed and tuned to provide adhesion for the specific film and/or lens substrate target materials.

In some embodiments, a solvent may be used to dissolve the primer components. When present, the solvent may be included in an amount ranging from 60 wt. % to 98.75 wt. %. In some aspects, the solvent is at least one of a ketone or an acetate solvent. Exemplary solvents include, but are not limited to, acetone, methyl ethyl ketone, ethyl acetate, cyclopentanone and cyclohexanone, and any combination thereof.

According to the invention, the primer monomer may be the same as the polymerized lens monomer. When the primer monomer is the same as the lens monomer, the monomer aids in compatibilizing the primer composition with lens polymer. According to the invention, the primer monomer may be different from the lens polymerized monomer and is, in this case, selected to include the same reactive functional group as the lens monomer. Indeed, the primer monomer may be different from the lens monomer, but is still be able to react with the polymerized lens monomer. That is why in this case, the primer monomer is selected to include the same reactive functional group as the lens monomer. For example, a lens monomer may primarily consist of allyl diglycol carbonate, and the primer monomer may be allyl ether. Although both lens monomer and primer monomer are different compounds, they may react with each other by virtue of their reactive functional group. In some aspects, the primer monomer comprises a reactive group functionality of 1 or more, and preferably at least 2. Increasing the reactive functionality increases the types of functional groups with which the primer monomer can react. The primer monomer may include a reactive group or groups selected from the group consisting of allyl, vinyl, acrylic, thiol, isocyanate, epoxy and amine.

In some embodiments, the at least one reactive oligomer or high molecular weight polymer has a reactive functionality of 1 or more and preferably 2. Increasing the reactive functionality increases the quantity or types of functional groups with which the reactive oligomer or high molecular weight polymer can react. In some embodiments, the at least one reactive oligomer or high molecular weight polymer is a urethane dimethacrylate. In some embodiments, the at least one reactive oligomer or high molecular weight polymer is a methylmethacrylate-based resin.

Some aspects of the disclosure are directed to an optical article. More precisely, some aspects of the disclosure are directed to an optical article comprising an ophthalmic lens made of at least one polymerized monomer, a functional laminate comprising a thermoplastic film on each of a forward-facing surface and a rear-facing lens-contacting surface, and a primer coating deposited on the lens-contacting surface of the functional laminate. In some embodiments, the functional laminate is a polarizing laminate. The polarizing laminate may include a polyvinyl alcohol (PVA) layer as a polarizing layer. At least one of the functional laminate forward-facing surface thermoplastic film and rear-facing lens-contacting surface thermoplastic film comprises cellulose triacetate (TAC). In some embodiments, both of the functional laminate forward-facing surface thermoplastic film and rear-facing lens-contacting surface thermoplastic film are TAC films.

Prior to deposition on the functional laminate, the primer coating comprises at least one reactive oligomer or high molecular weight polymer with a $M_w$ between about 2,000 and about 100,000 in an amount ranging from 1 wt. % to 25 wt. %, at least one UV or thermal initiator, at least one monomer in an amount ranging from 0.25 wt. % to 15 wt. % that is capable of reacting with a lens polymerized monomer, and optionally a solvent, wherein the primer coating monomer is the same as the lens polymerized monomer or is different and is selected to include the same reactive functional group as the lens monomer. When present, the optional solvent may be included in an amount ranging from 60 wt. % to 98.75 wt. %. In some embodiments, the ophthalmic lens monomer is allyl diglycol carbonate. The primer monomer may react with the ophthalmic lens monomer to provide chemical bonds that form the basis of strong adhesion between the functional laminate and the ophthalmic lens. In some aspects, the primer is applied onto one or both sides of a functional laminate, dried, UV cured, then cast in a casting monomer formulation.

In some embodiments, a method of preparing a primer coating is provided. More precisely, a method of preparing a primer coating for supporting adhesion between contacting surfaces of a functional laminate and an ophthalmic lens comprising at least one polymerized monomer is provided. The method comprises the steps of providing a solvent, and adding to the solvent at least one reactive oligomer or high molecular weight polymer with a $M_w$ between about 2,000 and about 100,000 in an amount ranging from 1 wt. % to 25 wt. %, at least one UV or thermal initiator, and at least one monomer in an amount ranging from 0.25 wt. % to 15 wt. % that is capable of reacting with the lens polymerized monomer, wherein the primer coating monomer is the same as the lens polymerized monomer or is different and is selected to include the same reactive functional group as the lens monomer. The solvent is provided in an amount ranging from 60 wt. % to 98.75 wt. %. The primer coating may be fully or partially dried prior to or subsequent to application. The primer coating may be applied to one or both of a functional laminate surface and an ophthalmic lens surface. The primer coating may be provided with an amount of UV light or an increase in temperature sufficient to activate the initiator and initiate the curing process. The primers may be applied onto a TAC polar laminate by flow coating, spin coating, gravure coating, slot die coating, or other means known to those of skill in the art. In some aspects, the primer coating may be dried from about 15 seconds to about 2 minutes at a temperature ranging from about 60° C. to about 80° C. Other drying conditions known to those of skill in the art may be employed to remove the solvent. After drying, the primer may be cured, for example, by using a UV light source. One exemplary, non-limiting UV light source is a Heraeus Noblelight F300S with a H+ bulb. Power, energy, and exposure time may be selected to optimize curing. Typical, non-limiting curing conditions include about 7 feet/min (UVA ~1500 mJ/cm$^2$, ~1200 mW/cm 2) to about 21 feet/min (500 mJ/cm$^2$, 1100 mW/cm 2).

Any embodiment of any of the disclosed compositions and/or methods can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

The term "about" or "approximately" or "substantially unchanged" are defined as being close to as understood by one of ordinary skill in the art, and in one non-limiting embodiment the terms are defined to be within 10%, preferably within 5%, more preferably within 1%, and most preferably within 0.5%.

The use of the word "a" or "an" when used in conjunction with the term "comprising" in the claims and/or the specification may mean "one," but it is also consistent with the meaning of "one or more," "at least one," and "one or more than one."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The compositions and methods for their use can "comprise," "consist essentially of," or "consist of" any of the ingredients or steps disclosed throughout the specification. With respect to the transitional phase "consisting essentially of," in one non-limiting aspect, a basic and novel characteristic of the compositions and methods disclosed in this specification includes the compositions' abilities to reduce or prevent delamination between a film laminate and a cast-polymerized lens.

Other objects, features and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

DETAILED DESCRIPTION

Various features and advantageous details are explained more fully with reference to the non-limiting embodiments that are illustrated in the accompanying drawings and detailed in the following description. It should be understood, however, that the detailed description and the specific examples, while indicating embodiments, are given by way of illustration only, and not by way of limitation. Various substitutions, modifications, additions, and/or rearrangements will be apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Some aspects of the disclosure are directed towards a range of primer compositions that has been developed to provide enhanced adhesion between a TAC-based polarizing laminate and an allyl diglycol carbonate-based ophthalmic lens substrate. The primer is designed to provide a level of penetration into at least a portion of the surface of the TAC layer or lens substrate. In some embodiments, the inclusion of a solvent or solvent blend aids in allowing the primer to penetrate the TAC layer or lens substrate surface. Penetration of the primer serves to anchor the primer to the TAC-based laminate and/or the ophthalmic lens substrate and supplement adhesion. When used in conjunction with a lens casting process, the primer is applied onto a TAC polarizing laminate, optionally dried, optionally cured, then cast in a casting monomer formulation.

Example 1

A UV-reactive solid acrylic bead based on methyl methacrylate and tripropylene glycol diacrylate having a $M_w$ of 32,500, an acid number of 0.0, and a Tg of 75° C. (reactive high molecular weight polymer, Elvacite® 4026, Lucite International) was weighed out into a glass vial. Ethyl acetate was added and mixed until the polymer was dissolved. Allyl diglycol carbonate (monomer, CR39®, PPG) and a UV initiator (Irgacure® 819, BASF) were added and agitated until dissolved. The amounts and ratios are provided in Table 1 below.

TABLE 1

| Primer Formulation, Example 1 | | |
| --- | --- | --- |
| Component | Wt. (g) | Wt. % |
| Polymer | 1.0 | 10.0 |
| Solvent | 8.7 | 87.0 |
| Monomer | 0.2 | 2.0 |
| UV initiator | 0.1 | 1.0 |

Example 2

The solvent, monomer, and UV initiator from Example 1 were retained, and the reactive high molecular weight polymer was replaced with a polymer based on methyl methacrylate, n-butyl methacrylate, and tripropylene glycol diacrylate, having a $M_w$ of 20,500, an acid number of 0.0 and a Tg of 40° C. (reactive high molecular weight polymer, Elvacite® 4059, Lucite International). The component amounts and ratios were kept the same as in Example 1.

Example 3

The solvent, monomer, and UV initiator from Example 1 were retained, and the reactive high molecular weight polymer was replaced with an aliphatic polyester based urethane dimethacrylate oligomer having a Tg of 78° C. (Sartomer® CN1963). The component amounts and ratios were kept the same as in Example 1.

Example 4

The solvent, monomer, and UV initiator from Example 1 were retained, and the reactive high molecular weight polymer was replaced with low molecular weight urethane dimethacrylate oligomer having a Tg of 189° C. (Sartomer® CN1964). The component amounts and ratios were kept the same as in Example 1.

Lens Casting and Delamination: Primer Examples 1-4

TAC/PVA/TAC polarizing laminate wafers were individually coated with the primers of Examples 1-4, dried, and exposed to UV radiation. The wafers were individually cast in allyl diglycol carbonate (lens monomer, CR39®, PPG), and the resulting lenses were subjected to surface and aggressive edging tests (SET) and inspected for delamination. Table 2 depicts the delamination test results for primer Examples 1-4.

TABLE 2

Primer Examples 1-4, SET Adhesion Results

|  | Example 1 | Example 2 | Example 3 | Example 4 |
|---|---|---|---|---|
| 4-base lens | 2/2 Pass | NA | 2/2 Pass | 6/6 Pass |
| 5-base lens | 3/4 Pass | 3/6 Pass | 4/4 Pass | NA |
| SET adhesion | Good | Fair | Good | Good |

Lens Casting and Delamination: Control Examples

Controls were run using a non-reactive polyurethane end-capped with hydroxyl groups, in methylethyl ketone (MEK) and ethyl acetate. Allyl diglycol carbonate monomer was included in amounts of 0%, 0.4% and 0.8%. The primers were applied onto TAC polarizing wafers and individually cast in allyl diglycol carbonate. No adhesion was obtained for the control primers.

TABLE 3:

Control Examples, SET Adhesion Results

|  | Control 1 | Control 2 | Control 3 | Control 4 | Control 5 | Control 6 |
|---|---|---|---|---|---|---|
| Polymer (Desmomelt ® 540/1) | 0.40 | 0.36 | 0.32 | 0.40 | 0.36 | 0.32 |
| Solvent (methylethyl ketone) | 9.60 | 9.60 | 9.60 |  |  |  |
| Solvent (ethyl acetate) |  |  |  | 9.60 | 9.60 | 9.60 |
| Monomer (allyl diglycol carbonate) | — | 0.04 | 0.08 | — | 0.04 | 0.06 |
| Adhesion | Fail | Fail | Fail | Fail | Fail | Fail |

The presently disclosed chemisorptive primer compositions provide enhanced adhesion between TAC laminates and cast allyl diglycol carbonate lenses. The claims are not to be interpreted as including means-plus- or step-plus-function limitations, unless such a limitation is explicitly recited in a given claim using the phrase(s) "means for" or "step for," respectively.

The invention claimed is:

1. An optical article comprising:
    an ophthalmic lens comprising at least one polymerized monomer;
    a functional laminate deposited onto the ophthalmic lens comprising a thermoplastic film on each of a forward-facing surface and a rear-facing lens-contacting surface;
    a primer coating deposited on the lens-contacting surface of the functional laminate;
    wherein on the functional laminate, said primer coating comprises:
        at least one reactive oligomer or high molecular weight polymer with a $M_w$ between about 2,000 and about 100,000 in an amount ranging from 1 wt. % to 25 wt. %;
        at least one UV or thermal initiator; and
        at least one monomer capable of reacting with the lens polymerized monomer, wherein the monomer is present in an amount ranging from 0.25 wt. % to 15 wt. %, wherein the primer coating monomer is the same as the lens polymerized monomer or is different from the lens polymerized monomer and is, in that case, selected to include the same reactive functional group as the lens monomer.

2. The optical article of claim 1, wherein the at least one reactive oligomer or high molecular weight polymer has a reactive functionality of 2.

3. The optical article of claim 1, wherein the at least one reactive oligomer or high molecular weight polymer is a urethane dimethacrylate.

4. The optical article of claim 1, wherein the at least one reactive oligomer or high molecular weight polymer is a methylmethacrylate-based resin.

5. The optical article of claim 1, wherein the primer coating monomer comprises a reactive group selected from the group consisting of allyl, vinyl, acrylic, thiol, isocyanate, epoxy and amine.

6. The optical article of claim 1, wherein the primer coating monomer comprises a reactive group functionality of at least 2.

7. The optical article of claim 1, wherein the functional laminate is a polarizing laminate.

8. The optical article of claim 7, wherein the polarizing laminate comprises a polyvinyl alcohol (PVA) polarizing layer.

9. The optical article of claim 1, wherein at least one of the functional laminate forward-facing surface thermoplastic film and rear-facing lens-contacting surface thermoplastic film comprises cellulose triacetate (TAC).

10. The optical article of claim 1, wherein the primer coating comprises a solvent in an amount ranging from 60 wt. % to 98.75 wt. %.

11. The optical article of claim 1, wherein the solvent is at least one of a ketone solvent or an acetate solvent.

12. The optical article of claim 11, wherein the solvent is selected from the group consisting of acetone, methyl ethyl ketone, ethyl acetate, cyclopentanone and cyclohexanone, or any combination thereof.

13. The optical article of claim 11, wherein solvent is ethyl acetate.

14. A method of preparing a primer coating for supporting adhesion between contacting surfaces of a functional laminate and an ophthalmic lens comprising at least one polymerized monomer, the method comprising:
    providing a solvent, and adding:
        at least one reactive oligomer or high molecular weight polymer with a $M_w$ between about 2,000 and about 100,000 in an amount ranging from 1 wt. % to 25 wt. %;
        at least one UV or thermal initiator; and
        at least one monomer capable of reacting with the lens polymerized monomer, wherein the monomer is present in an amount ranging from 0.25 wt. % to 15 wt. %, wherein the primer coating monomer is the same as the lens polymerized monomer or is different from the lens polymerized monomer and is, in that case, selected to include the same reactive functional group as the lens monomer;
    wherein the solvent is provided in an amount ranging from 60 wt. % to 98.75 wt. %; and
    providing an amount of UV light or an increase in temperature sufficient to activate the initiator.

* * * * *